April 22, 1941.    R. C. WILLIAMS ET AL    2,239,452
METHOD AND APPARATUS FOR PRODUCING SEMITRANSPARENT COATINGS
Filed March 13, 1937    4 Sheets-Sheet 1
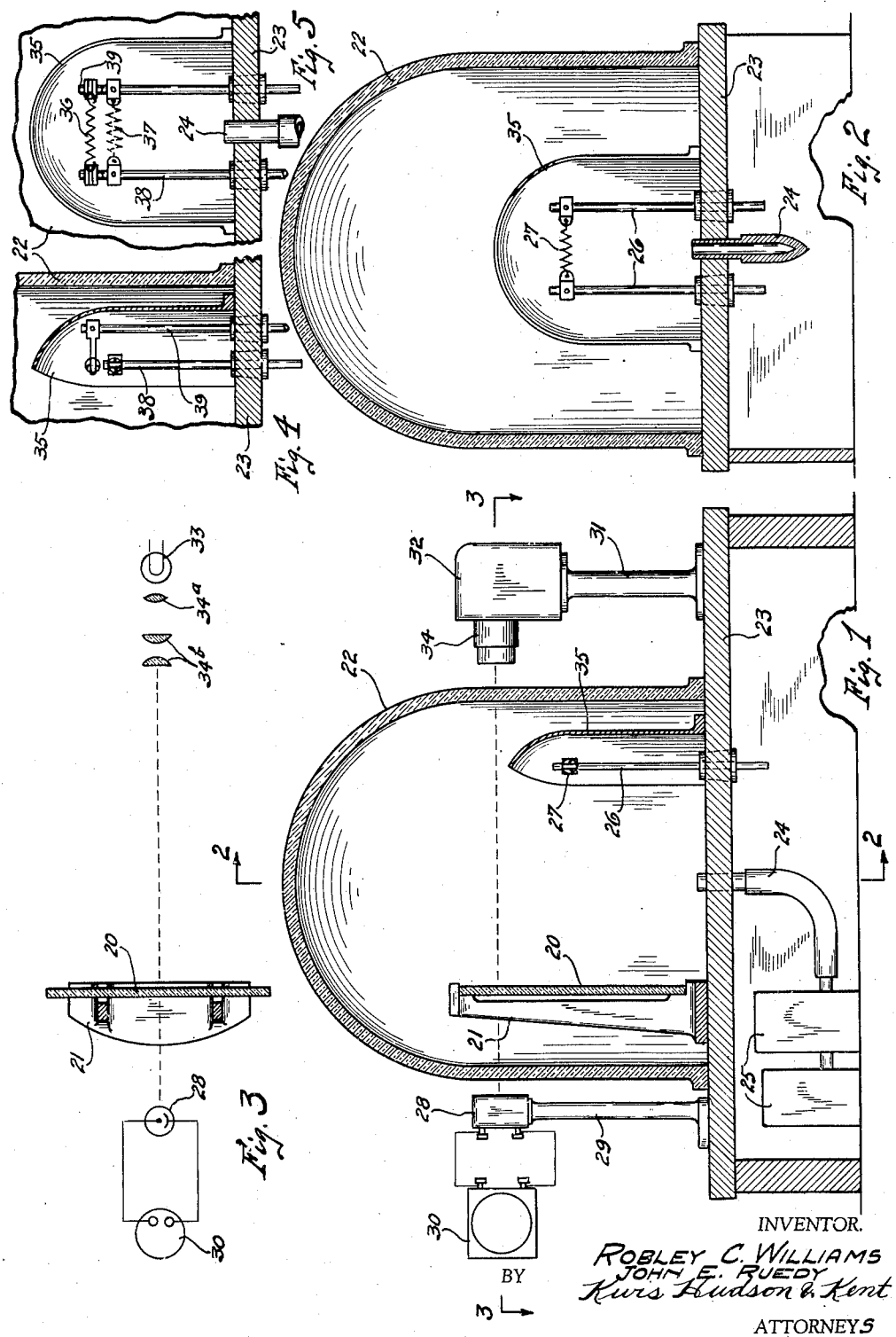
INVENTOR.
ROBLEY C. WILLIAMS
JOHN E. RUEDY
BY Kurs Hudson & Kent
ATTORNEYS

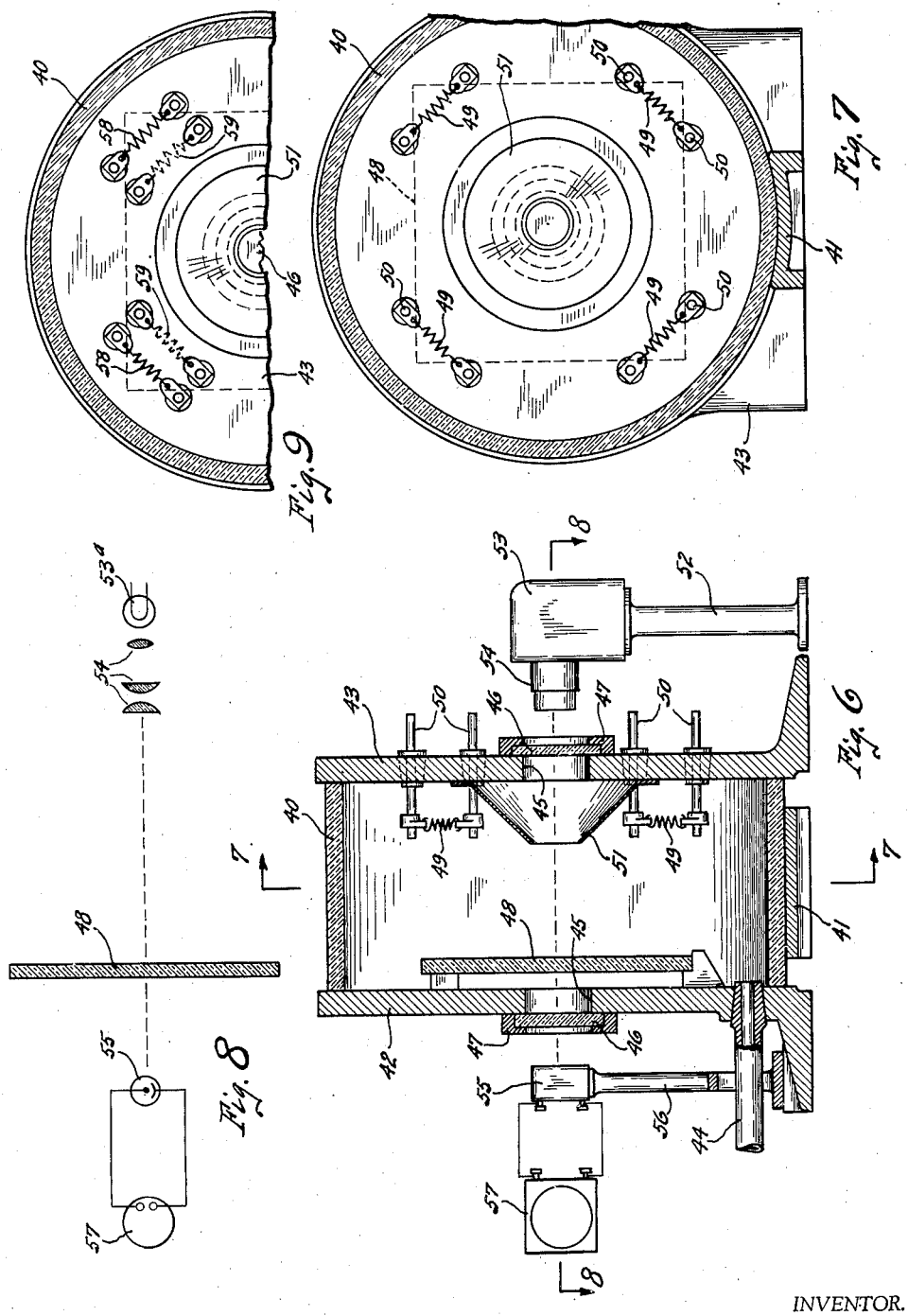

April 22, 1941.    R. C. WILLIAMS ET AL    2,239,452
METHOD AND APPARATUS FOR PRODUCING SEMITRANSPARENT COATINGS
Filed March 13, 1937    4 Sheets-Sheet 3
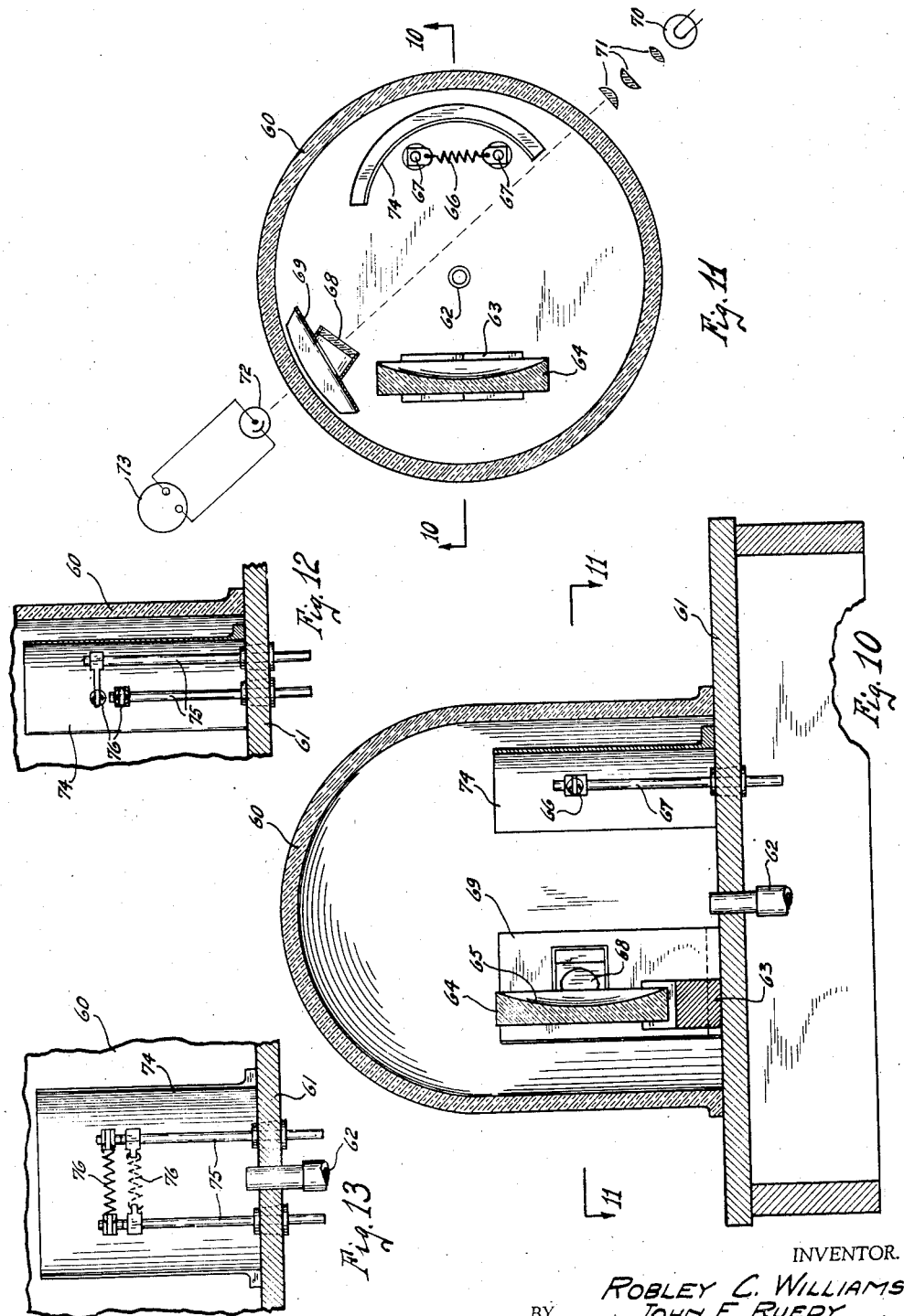
INVENTOR.
ROBLEY C. WILLIAMS
JOHN E. RUEDY
BY Kurs Hudson & Kent
ATTORNEYS

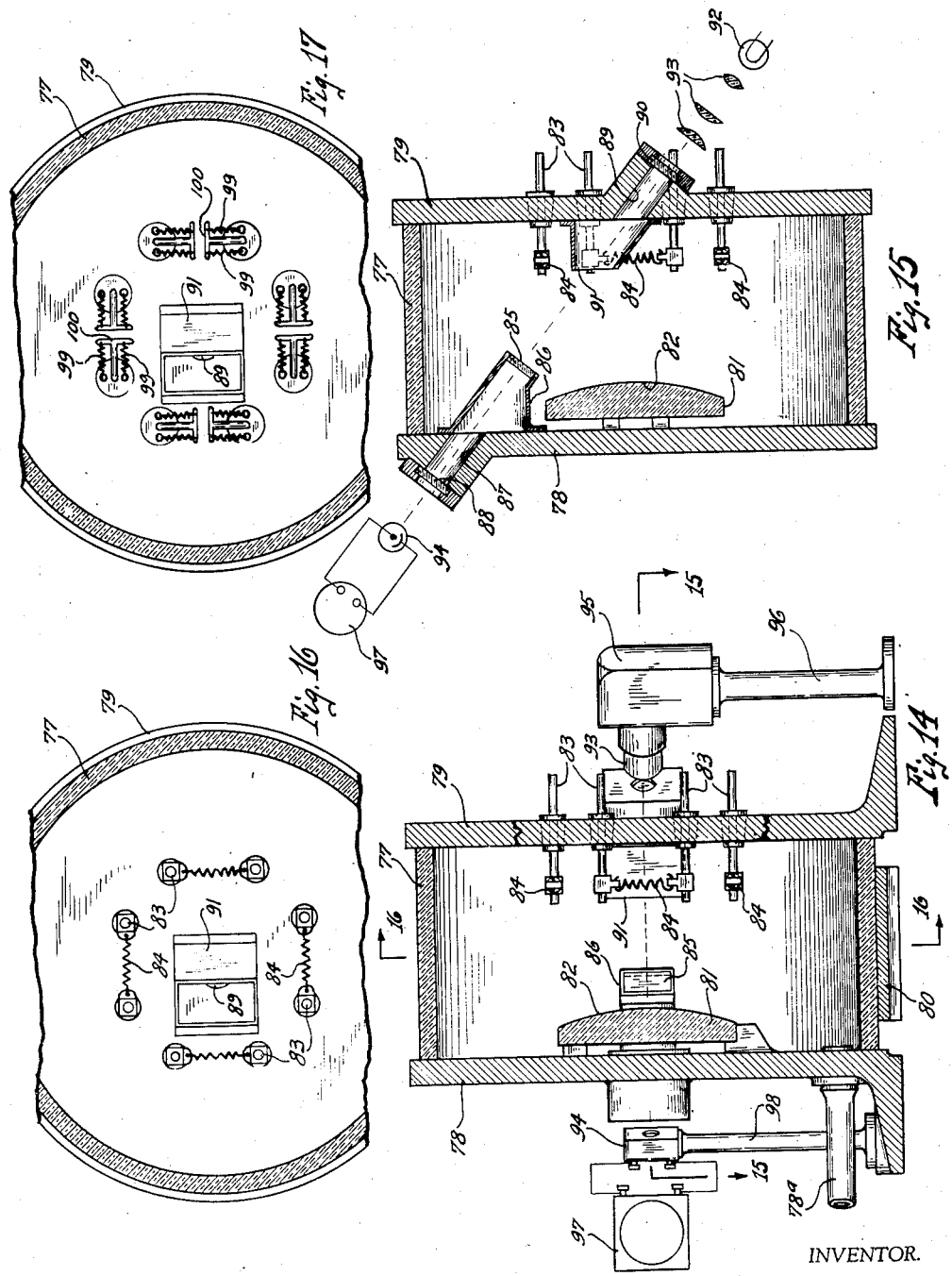

Patented Apr. 22, 1941

2,239,452

UNITED STATES PATENT OFFICE 2,239,452

METHOD AND APPARATUS FOR PRODUCING SEMITRANSPARENT COATINGS

Robley C. Williams, Ann Arbor, Mich., and John E. Ruedy, Haddon Heights, N. J.

Application March 13, 1937, Serial No. 130,680

12 Claims. (Cl. 91—12.2)

This invention relates to a method and apparatus for producing semi-transparent coatings upon various surfaces, and more particularly to a method and apparatus for producing semi-transparent coatings by means of thermal evaporation in a vacuum.

An object of the invention is to provide a method and apparatus for producing semi-transparent coatings upon surfaces, which are of such character that the light transmission and exclusion characteristics of the coatings can be accurately and readily regulated and determined.

Another object is to provide a method and apparatus for producing semi-transparent coatings upon surfaces by thermal evaporation in a vacuum, which are of such character that coatings of any predetermined degree of transparency can be readily and accurately applied to the surfaces.

Another object is to provide a method and apparatus for producing a semi-transparent coating upon a surface, wherein the degree of transparency of the coating can be controlled and determined and said coating can be formed of one material or of a plurality of different materials.

A further object is to provide a method and apparatus for producing a semi-transparent coating upon a surface, and wherein the degree of transparency of the coating and also its characteristics, with respect to the transmission and exclusion or reflection of different colors can be readily produced, controlled and determined.

Another object is to provide a method and apparatus for producing semi-transparent coatings upon either planular or non-planular surfaces and wherein the degree of transparency of the coating may be readily determined and controlled.

Another object is to provide a method and apparatus for producing by thermal evaporation in a vacuum a semi-transparent coating in accordance with any or all of the hereinbefore named objects and wherein the coating will be of uniform thickness.

Further and additional objects and advantages not hereinbefore specified, will become apparent hereinafter during the detailed description which is to follow. Referring to the accompanying drawings, Fig. 1 is a view partly in section and partly in elevation of one form of apparatus for carrying out the method; in connection with comparatively small surfaces, the evacuation chamber, the article to be coated, the shield and the support for the chamber being shown in section, while the other parts are shown in elevation.

Fig. 2 is a sectional view taken substantially on line 2—2 of Fig. 1 looking in the direction of the arrows.

Fig. 3 is a diagrammatic view and is taken substantially along the line 3—3 of Fig. 1 looking in the direction of the arrows.

Fig. 4 is a fragmentary view similar to Fig. 1 but showing a pair of filament supports and filaments instead of the single support and filament shown in Fig. 1.

Fig. 5 is a fragmentary view similar to Fig. 2 but illustrating the pair of supports and filaments shown in Fig. 4.

Fig. 6 is a view illustrating partly in section and partly in elevation a different form of apparatus from that shown in Fig. 1, and which is adapted for coating comparatively large surfaces and wherein a multiple number of filaments of the same kind are employed for producing the coating.

Fig. 7 is a sectional view taken substantially on line 7—7 of Fig. 6 looking in the direction of the arrows.

Fig. 8 is a schematic view taken substantially on line 8—8 of Fig. 6 looking in the direction of the arrows.

Fig. 9 is a fragmentary view similar to Fig. 7 and illustrating an apparatus wherein a plurality of different kinds of filaments are employed for producing a coating formed of a plurality of coating materials.

Fig. 10 is a view similar to Fig. 1 but illustrating an arrangement wherein a comparatively small concave surface is to be coated and a dummy surface is employed for the purpose of determining the degree of transparency of the coating, said Fig. 10 being taken substantially on line 10—10 of Fig. 11 looking in the direction of the arrows.

Fig. 11 is a view partially in section and partially diagrammatic and is taken substantially on line 11—11 of Fig. 10 looking in the direction of the arrows.

Fig. 12 is a fragmentary view similar to Fig. 10 but showing a plurality of filaments and filament holders, and wherein the filaments are coated with or carry different coating materials for producing a combined coating upon the surface.

Fig. 13 is a front elevational view of Fig. 12 and is taken looking from the left hand side of said Fig. 12 as viewed in the drawings.

Fig. 14 is a view similar to Fig. 6 and illustrates an apparatus for the coating of a comparatively large convex surface, wherein a plurality of filaments of the same kind are employed to form a coating of a single material and wherein a dummy transparent article is employed to enable the degree of transparency of the coating to be determined.

Fig. 15 is a view partially in section and partially diagrammatic and is taken substantially on line 15—15 of Fig. 14 looking in the direction of the arrows.

Fig. 16 is a fragmentary sectional view taken substantially on line 16—16 of Fig. 14 looking in the direction of the arrows, and Fig. 17 is a view similar to Fig. 16 but illustrates the apparatus as employing a plurality of different kinds of filaments for the purpose of forming a coating on the surface which is formed of more than one coating material.

Semi-transparent coatings or films are used upon surfaces for a variety of different purposes and such coatings or films may be formed of a single material or of a combination of different materials. The combination coating is useful when some special color transmission is required and which could not be obtained from a coating of a single material or metal. The desired transmission might be some particular color or, as will later be referred to, it might be a perfectly neutral transmission, since "neutral filters" are of great utility. Only metals which show selective color transmission alone would be used in combination coatings for particular selective effects. As illustrative of such metals the following metals are referred to: silver (blue violet), chromium (brown), aluminum (blue), gold (green), copper (green), selenium (orange). Any two or more of these metals when applied to a surface successively as coating materials will produce a transmission equal to the product of the transmissions of the component metals.

One of the chief fields in which semi-transparent coatings or films have important utility is in the color photography art, wherein the camera employs a mirror which must reflect or exclude and transmit different colors in light in predetermined proportions.

Semi-transparent coatings may be formed of one material or of a combination of different materials as, for example, a combination coating for use in the development of color cameras for motion pictures where a coating was needed which would reflect red and blue light readily but would transmit green light. A combination coating or film having these characteristics was developed wherein aluminum and copper were combined as the coating materials, the aluminum reflecting the blue light, the copper the red light, and, in addition, causing the transmission of the green light.

Many devices requiring a selective transmission of light could advantageously employ a combination semi-transparent coating as, for example, a coating which will transmit all colors to an equal degree, and hence in effect be a neutral coating or filter as hereinbefore stated. An example of a combination coating having such characteristic is a coating formed of chromium and platinum. One instance of this type of apparatus is the spectro-photometric apparatus, wherein it is necessary to reduce the intensity of one source of light in comparing it with another source without changing the color curve of the first source.

Among the instances wherein a single semi-transparent coating could be employed is the case of mirrors for interferometers that are used in testing very minute expansions and contractions in industrial machining of the highest accuracy. Also an optical device such as a binocular microscope wherein it is necessary to obtain light through one lens system and split it into two beams for the eyes, must necessarily employ a semi-transparent coating upon the mirrors of the devices. Semi-transparent coatings or films are also advantageously used in connection with advertising displays in which a light that flashes periodically illuminates the advertising matter in a box behind the coated mirror, while said mirror when viewed from the front and when the light behind the mirror is not lit has the appearance of an ordinary reflecting mirror.

Another use which has developed for semi-transparent films or coatings upon a mirror is to position such mirrors in the front doors of buildings so that one on the inside of the building can see through the mirror, while from the outside the mirror has the appearance of an ordinary mirror.

Some of the many uses for semi-transparent films have been set forth above, but it will be understood that there are many other uses which are not herein enumerated.

The semi-transparent coatings or films can be applied to different forms of surfaces as, for example, planular, non-planular or other surfaces.

Referring to the drawings, and particularly to Figs. 1 to 3, an apparatus and method are disclosed for forming a semi-transparent coating upon an article such as a plate of glass having a planular surface and which is indicated at 20. The surface or object to be coated is, in this instance, mounted and held upon a suitable support 21 that is arranged within a chamber to be evacuated and which chamber in the present instance is shown as a glass bell-jar and indicated at 22. The glass bell-jar and the support 21 may be suitably positioned upon and sealed with respect to a table or base 23 having a smooth upper surface. The interior of the chamber is connected by means of a suitable conduit 24 to evacuating pumps indicated generally by the numeral 25, it being understood that when said pumps are operated the air is exhausted from the sealed chamber to create a substantial vacuum therein suitable for carrying on thermal evaporation, as is well understood in the art.

Filament supports 26 are arranged in the vacuum chamber and carry adjacent their upper ends a filament 27, preferably formed of tungsten wire and coated with or carrying the material to be evaporated therefrom onto the surface 20. Where the surface to be coated is comparatively small in area only a single filament need be employed to adequately coat such surface.

It will be understood that the filament 27 is suitably connected with a source of electrical energy so that it can be energized or heated to evaporate the coating material therefrom and the filament supports 26 carried by the base 23 are suitably insulated therefrom, in this instance by tapered insulating plugs.

Exteriorly of the vacuum chamber 22 and back of the article the surface 20 of which is to be coated, there is located a light measuring device including a light sensitive cell, such as a Photronic or photo-electric cell, as indicated at 28 in Figs. 1 and 3, which cell may be carried by a suitable standard 29 mounted on the table or base 23. The light sensitive cell 28 is electrically connected with an ammeter 30, wherefore when the cell is energized the intensity of the current produced thereby can be directly read on the ammeter.

At the diametrically opposite side of the chamber 22 from the light sensitive cell and exteriorly of the chamber a standard 31 on the base or table 23 supports a box 32 housing a source of light, such as an electric lamp 33 of suitable magnitude, as will later be explained, and also houses and supports an optical system indicated at 34 in Fig. 1 and comprising, in this instance, a double convex lens 34a and two single convex lens 34b arranged with their convex sides adjacent to each other as shown in Fig. 3. It will be understood that the purpose of the light 33 and the optical system 34 is to produce a straight concentrated beam of light (indicated by dash lines) which preferably but not necessarily will pass perpendicularly through both walls of the chamber 22, article 20 and register upon the Photronic cell 28, and hence any suitable form of light or optical system may be employed in place of that shown and described.

A shield 35 is positioned in the chamber adjacent the filament 27 and in such manner as to prevent the material which is evaporated from the filament being deposited upon that portion of the inner surface of the wall of the chamber 22 through which the light beam from the light 33 must pass. It will be noted that in addition to the portion of the wall of the chamber 22 protected by the shield 35, that portion of the wall located behind the article also is protected by the article from the material evaporated from the filament, it being understood that since the material is evaporated in a vacuum it will radiate from the filament in substantially straight paths, hence those portions of the inner surface of the wall of the chamber through which the beam of light must pass will have no deposition of the coating material thereon, wherefore the beam of light will not be obstructed at these points but will only be obstructed in varying degrees where it passes through the article being coated.

Assuming that the article to be coated has been positioned in the chamber and also that a filament coated or carrying the coating material is mounted upon the filament supports 26 and the shield is positioned as shown, while the chamber has been properly evacuated, a semi-transparent film of any predetermined or desired degree of transparency can be deposited upon the surface as follows:

A plain glass will transmit about 96% of light. As an example we will consider that the lamp 33 is a 500 watt light and such light shining in a concentrated beam through the walls of the chamber and through the uncoated plain glass article will cause an energizing of the Photronic cell such as to produce a current of substantially one milliampere which can be readily registered and directly read upon the ammeter. The ammeter preferably will bear indicia calibrated in terms of light transmission, wherefore when the beam of light passing through the uncoated glass energizes the light sensitive cell the reading on the ammeter should be 92. It will be understood, of course, that the ammeter may have the usual indicia thereon, in which case it will be necessary to calculate the changes in light transmission occurring during the coating process.

Upon energization of the filament the coating material thereon commences to evaporate and is gradually deposited upon the surface 20. Supposing it is desired that the article transmit 52% of light when coated, it will be understood that the evaporation of the material from the filament is continued until the ammeter registers 52 or a drop of 40%, it being appreciated that as the material is deposited upon the surface 20 the beam of light passing therethrough is gradually obstructed in greater degree. The current to the filament is now interrupted so that a reading of the ammeter can be taken while the filament is not energized and is in a non-glowing state, since a small amount of light is given off by the filament when it is energized and glowing, and hence this light affects the light sensitive cell. If the reading upon the ammeter is not quite 52 when the filament is cooled, then it will be necessary to again energize the filament and produce further evaporation of the coating material to bring the reading on the ammeter slightly above 52%, and in an amount such that when the filament again is cooled the reading will be exactly 52%.

As previously pointed out, it is often required that semi-transparent films transmit or reflect different colors in light in varying degrees or proportions. Inasmuch as a single coating material, such as a metal will not produce the required transmission and reflection characteristics in these situations it is necessary to arrive at a combination coating, that is a coating formed of a plurality of different materials which combined will produce the required transmission and reflection characteristics, as for example, a coating formed of aluminum and copper as before referred to. In these instances a plurality of filaments will be employed, and certain of the filaments will carry or be coated with one of the coating materials while the others will carry or be coated with other of the coating materials.

In Figs. 4 and 5 there is shown by way of illustration a pair of filaments 36 (full lines) and 37 (dash lines) mounted upon pairs of filament supports 38 and 39 similar to the filament supports 26. The filament 36 will be coated or will carry one kind of material, while the filament 37 will carry another kind of material.

Again assuming that the combination film to be deposited is to have a transmission of light of 52%, or a reduction of 40% from the normal transmission of 92%, and further assuming that equal proportions of the coating materials are desired and that the evaporation of the different materials is equal for any given period of time, one or the other of the filaments 36 and 37 will first be energized to evaporate the coating material therefrom and to deposit the same upon the surface 20. This filament is energized until the transparency of the article has been so reduced that the ammeter reads 72%. Then this first energized filament is cooled and the second filament is energized to evaporate the coating material therefrom and to deposit the same upon the surface, until the ammeter reading is 52%, it being understood that the final reading on the ammeter is taken, as previously explained, with both filaments non-energized and cooled, so that the glow from the energized filament will not be registering upon the light sensitive cell.

It will also be understood that in the example just given the two coating materials have been described as deposited in equal proportions upon the surface, but there are instances where it will be desirable to deposit the coating materials in other proportions, as, for example, in the proportion of 2 to 1, 3 to 1, 3 to 2 or some other proportion, and in such event the time of glow of one filament will be in such proportion to the time of glow of the other filament. The proportions followed in combination coatings is determined from the characteristics of the coating materials and the desired color transmission or reflection as has been hereinbefore explained.

It will be noted that the combination coating has been described as formed by depositing the different coating materials successively upon the surface to be coated. There may be instances, however, where the different coating materials should be deposited concurrently upon the surface to be coated.

So far as is now known there is no difference in the transmission characteristics of thin or semi-transparent films formed of a combination of coating materials whether the different materials are applied successively or concurrently. However, there is a difference in the reflecting characteristics of a combination coating where the materials are deposited either successively or concurrently. As illustrative, suppose copper and aluminum are to be deposited. The transmission of the combined film will be green, irrespective of whether or not the copper and aluminum are deposited successively or concurrently. But if the aluminum film is applied after the application of the copper film the reflectivity of the combined coating will be predominantly neutral. However, if the reverse occurs and the copper is deposited last the reflectivity of the combined coating will be predominantly reddish, that is to say, although the reflectivities of both films will be present in the combined semi-transparent coating irrespective of whether or not the films are deposited successively or concurrently, the reflectivity of the material last applied in the second instance will be the dominant one. When the films are deposited concurrently, the resultant reflectivity of the coating will lie somewhere between the reflectivities of the component metals.

As previously stated, when the surface to be coated is comparatively small a single filament can usually be employed where the coating is of a single material. However, where the surface to be coated is a comparatively large surface it is necessary to employ a plurality of filaments in order to coat the surface evenly and to the proper thickness, irrespective of whether or not the coating is a single one or a combined coating.

In Figs. 6 to 8 inclusive an apparatus is disclosed which is suitable for the coating of large surfaces. This apparatus comprises a chamber to be evacuated, which is formed, in this instance, of a glass cylinder 40 mounted upon a suitable support 41 and having its opposite ends closed by metal end walls 42 and 43 which are suitably supported by enlarged foot-like portions. It will be understood that the end walls and the cylinder are connected together in suitably sealed relationship, so that the chamber can be evacuated by pumps, such as the pumps 25 previously referred to and connected to the conduit 44 which communicates with the interior of the chamber. Inasmuch as the end walls are formed of metal and hence not transparent, the walls 42 and 43 are each provided with an opening 45 arranged in alignment with each other and located in this instance centrally of the walls and covered by transparent plates such as glass plates 46 supported on the outside of the walls by suitable supporting frames 47 and sealed with respect to the end walls. The article, a surface of which is to be coated is indicated at 48, and in this instance is mounted upon suitable supports carried by the end wall 42.

In the present disclosure four filaments 49 are employed for coating the surface of the article 48, and it will be noted that these filaments are carried by suitable filament supports 50 insulated from the plate 43 by tapered supporting plugs and arranged in pairs opposite the corners of the article 48, see Fig. 7, wherein the article is illustrated by dash lines. When the filaments are energized and operated for a given length of time each filament will coat the surface of the article 48 to substantially one-fourth of the desired thickness of the coating.

A conically shaped shield 51 is secured to the inner side of the wall 43 and surrounds the opening 45 to prevent the coating material evaporated from the filaments being deposited upon the inner side of the glass plate 46 that closes the opening in the wall 43. The article 48 being located so as to cover the opening 45 in the wall 42 acts to protect the glass plate 46 which closes said opening from receiving a deposit of the evaporated coating material, and hence both glass plates during the coating operation retain their transparency.

A standard 52, box 53 housing an electric lamp 53a and supporting an optical system 54, identical with the standard 31, box 32 and optical system 34 previously referred to, are arranged exteriorly of the chamber and so located with respect to the openings 45 that the concentrated beam of light from the lamp 53a passes in a straight line through both plates 46 and the center of the article 48 and registers upon and energizes a light sensitive cell, such as a Photronic cell 55 corresponding to the cell 28 previously referred to and carried by a standard 56 corresponding to the standard 29, said cell being electrically connected with an ammeter 57, as has been previously explained.

It will be understood that the evaporation of the material from the filaments and the deposit thereof upon the surface of the article 48 to have the semi-transparent coating is carried out in substantially the same way as has previously been described in connection with the apparatus shown in Figs. 1 to 3 inclusive, except as will now be explained.

As previously stated, the surface of the article 48 is comparatively large, and in order to provide a coating thereon of sufficient and uniform thickness it is necessary to employ more than one filament, since the coating material which a single filament is provided with would not be sufficient to produce the desired coating upon the comparatively large surface. Therefore, it has been found necessary in connection with large surfaces and in order to provide a coating sufficiently thick to have the desired degree of transparency, to employ more than one filament as, for example, to employ four filaments, such as have been illustrated and described in connection with either Figs. 6 and 7. It will be understood that the material from each of the four filaments which are located symmetrically about the line normal to the center of the article is deposited equally throughout the surface of the article, and that in using four filaments successively the deposit of the material upon the surface is cumulative and uniform.

Assuming that the semi-transparent coating to be deposited upon the article 48 is to have a transmission of 52%, that is, a reduction of 40% from the normal transmission of 92%, then as the filaments are energized successively each filament will be operated for a sufficient period to deposit upon the surface a film which will reduce the transparency of the article, and hence cause a reduction in the ammeter reading of 10%.

Where the evaporation of material from the filaments is equal for a given period of time then the filaments could be concurrently energized and a coating of uniform thickness obtained, in which event the evaporation of the coating material from all the filaments would be continued until the transparency of the article had been reduced, so that the ammeter gave a reading of 52%. It will be understood that before taking the final reading of the ammeter the filaments are cooled so that their glow will not affect the reading, and then if the ammeter does not read 52% an additional heating of the filaments is effected to bring the coating to the desired thickness.

In Fig. 9 which is a fragmentary view corresponding to Fig. 7, there is illustrated an arrangement for providing a combination semi-transparent coating upon the surface of the article 48. In providing the combination coating a plurality of different sets of filaments will be employed and the filaments of each set will be coated or carry a different material to be evaporated and deposited upon the surface, as has been explained in connection with Figs. 4 and 5. In the illustration of Fig. 9 two sets of filaments are disclosed, one set being indicated by the filaments 58 (in full lines) and the other set by the filaments 59 (in dash lines). It will be understood that in forming the combination coating the same procedure is followed as has been previously explained in connection with Figs. 4 and 5, and also in connection with Fig. 6, wherein an apparatus adapted for forming a single coating is illustrated and described, it being further borne in mind that the two sets of filaments may be energized successively to produce various proportions of the material in the combined coating, or they may be energized concurrently to produce substantially equal proportions of the materials in the coating, assuming the evaporation of the materials is equal for like periods of time.

In Figs. 10 and 11 an apparatus substantially similar to the apparatus shown in Figs. 1 and 2 is employed to produce semi-transparent coatings upon a non-planular comparatively small surface, such as a concave surface. The apparatus comprises a glass bell-jar 60 mounted in sealed relationship upon a table or base 51 and adapted to be evacuated by means of pumps similar to the pumps 25 that are connected to a conduit 62 which communicates with the interior of the chamber. The article the surface of which is to be coated is mounted upon a suitable support 63 located within the chamber, and it will be noted that the article indicated at 64 is a glass disk and is provided with a concave surface 65 which is to have the semi-transparent coating deposited thereon. Inasmuch as in this instance the area of the surface to be coated is comparatively small a single filament 66 is used in the chamber, and, as has been previously explained, said filament is either coated with or carries the coating material that is to be evaporated therefrom when the filament is energized and heated. The filament is carried by filament supports 67, similar to the supports 26 previously described and mounted in tapered insulating plugs located in the base or table 61.

In view of the fact that the surface to be coated is non-planular, i. e., concave, the concentrated beam of light cannot be passed directly through the article due to refraction, and in order to overcome this difficulty a dummy article or surface is employed. This dummy article or surface is in the form of a glass plate 68 having planular surfaces on both sides and mounted in a suitable support 69 located within the chamber. It will be noted that the support 69 is so positioned that the surface of the glass plate 68 lies in the prolongation of the curvature of the surface 65, wherefore the surface of the plate 68 is at an equal distance from the filament as the surface of the article to be coated, as clearly indicated in Fig. 11, and will receive the same density of coating.

An electric lamp 70 and an optical system 71 are employed for producing the concentrated beam of light, and said lamp and system correspond to the lamp 33 and the optical system 34 described in connection with Figs. 1, 2 and 3, and may be supported in a similar manner.

It will be seen that the concentrated beam of light passes substantially perpendicularly at both sides through the wall of the chamber 60 and through the central part of the dummy plate 68 and registers upon a light sensitive cell such as a Photronic cell, indicated at 72 and corresponding to the light sensitive cell 28 previously explained, and also electrically connected to an ammeter 73 calibrated in terms of light transmission, as will be understood from the previous description.

A semi-circular shield 74 is arranged in the chamber and protects one portion of the wall of the chamber through which the beam of light is transmitted from having deposited thereon the coating material that is evaporated from the filament. Likewise, the support 69 is so positioned that it protects the other portion of the chamber wall from receiving a deposition of the coating material during the evaporation process.

It will be understood that the apparatus is operated in a manner corresponding to the operation of the apparatus shown in Figs. 1, 2 and 3, and inasmuch as the central portion of the plate 68 of the dummy is the same distance from the filament as the surface to be coated, such plate will receive during the coating operation a deposition of the coating material equal in quantity and thickness to the deposition upon the surface to be coated and which will hence gradually diminish the transmission of light through the plate in the same degree as the transmission of light is diminished through the article, and the degree of light transmission can be readily determined from the ammeter readings, as will be understood from the previous description.

Figs. 12 and 13 illustrate in a fragmentary manner an arrangement for producing upon the surface 65 a combined semi-transparent coating formed of a plurality of different materials. In this form of apparatus two pairs of filament supports 75 are illustrated, and each pair carries a filament 76, (one filament shown in full lines and the other in dash lines) with the respective filaments coated or carrying different coating materials as has been previously explained.

In Figs. 14 to 16 inclusive there is illustrated an apparatus for coating a non-planular and relatively large surface. This apparatus is substantially similar to the apparatus shown in Figs. 6 and 7 and comprises a chamber formed of a glass cylinder 77, together with end walls 78 and 79 connected to the cylinder 77 in sealing relationship, the chamber being evacuated by suitable pumps connected to the conduit 78a that communicates with the chamber. The cylinder 77 is mounted upon a suitable support 80, while the walls 78 and 79 are provided at their lower ends with supporting portions. The article 81 is in the form of a glass disc and has a non-planular surface 82 which is to be coated, and which, in this instance, is shown as a convex surface 82. The article 81 is mounted upon suitable supports carried by the end wall 78, while the end wall 79 carries, by means of insulating plugs, a plurality of filament supports 83 arranged in pairs, with the supports of each pair carrying adjacent their inner ends and within the chamber filaments 84, as clearly indicated in Figs. 14, 15 and 16.

Inasmuch as the surface to be coated is a non-planular surface, the concentrated beam of light which cooperates with the light sensitive cell to give the necessary ammeter reading by which to determine the degree of light transmission through the article cannot be passed through the article itself but must be transmitted through a dummy which, in this instance, comprises a plain glass plate 85 secured in a suitable support 86 attached to the inner side of the end wall 78 and located concentrically with an opening 87 formed in said end wall and covered exteriorly by a glass plate 88. The central portion of the glass plate 85 is located substantially an equal distance from the center of the filaments 84 as is the central point of the surface 82 which is to be coated, wherefore the plate 85 of the dummy will receive a deposition of the coating material substantially equal in thickness with the deposition of the material upon the surface 82.

The end wall 79 is provided with an opening 89 located substantially centrally of the filaments and lying in alignment with the plate 85 and the opening 87 and being covered exteriorly by a glass plate 90. A shield 91 is secured to the inner side of the end wall 79 and protects the glass plate 90 against receiving a deposition of the coating material, it being understood that the dummy plate 85 and support 86 similarly protect the glass plate 88 carried by the other end wall 78.

The beam of light comes from an electric lamp 92 and passes through an optical system 93, which concentrates it into a single beam that extends substantially centrally and perpendicularly through the plates 90, 85 and 88 and registers upon the light sensitive cell 94 to energize the same and produce a current readable upon the ammeter 97, as has been previously described. The lamp 92 and the optical system 93 are mounted in a box 95 corresponding to the box 32, previously explained, and arranged upon the upper end of a standard 96. The light sensitive cell 94 is suitably mounted upon a standard 98 corresponding to the standard 29, previously described.

It will be understood that the filaments 84 will be energized and the method carried out in a manner corresponding to that described in connection with Figs. 6, 7 and 8, and that the deposition of the coating material upon the surface 82 and upon the dummy 85 will be equal, wherefore the gradual diminution in light transmission occurring in the plate 85 will correspond to the reduction in transmission of the article 81 and can be directly determined from the ammeter reading.

In Fig. 17 the apparatus illustrated is adapted to produce a semi-transparent coating on the surface of the article which is formed of a plurality of different materials. In Fig. 17 there are illustrated two sets of filaments and the filaments of each set are coated or carry the different coating materials. As shown, each filament comprises two sections indicated at 99 and having one of their ends connected to supports mounted in a tapered insulating plug carried by the end wall 79, while the other ends are electrically connected through a central support indicated at 100 and also carried by the plug just referred to.

It will be understood that in producing the semi-transparent coating formed of a plurality of combined coating materials the sets of filaments may be energized successively or concurrently to evaporate the coating material therefrom and to form the combined semi-transparent coating upon the surface. This has been explained fully in connection with the explanation of the operation of the apparatus shown in Fig. 9 and need not be repeated with respect to Fig. 17.

Although preferred embodiments of the invention have been illustrated and described herein, it should be understood that the invention is susceptible of various modifications and adaptations within the scope of the appended claims.

Having thus described our invention we claim:

1. A method of producing upon a surface of a transparent article a coating of a predetermined degree of transparency, which comprises positioning the article in a vacuum and also positioning therein a transparent dummy, passing a concentrated beam of light through said dummy and upon a light measuring device, while depositing upon the surface of the article and upon a surface of the dummy a film of metallic coating material until the reading of the light measuring device indicates that the coating upon the surface of the dummy has reached a degree of transparency indicating that the predetermined degree of transparency has been reached in the coating on the article.

2. An apparatus for producing upon a surface of a transparent article a coating having a predetermined degree of transparency comprising a chamber adapted to receive the article and having transparent wall portions, means for evacuating said chamber, means for supporting a transparent dummy in said chamber, means for producing a deposit of coating material upon the surface of the article and upon the dummy, and means for determining the degree of transparency of the article and including an element for producing a concentrated beam of light so arranged that said beam will pass through said transparent wall portions and said dummy, and a light measuring device upon which said beam of light registers and comprising a light sensitive cell and an ammeter electrically connected therewith, wherefore when said cell is energized by said beam of light the ammeter will indicate changes in the transparency of the dummy and in turn the transparency of the article.

3. A method of producing upon a surface of a transparent article a coating having a predetermined degree of transparency, which comprises positioning the article in a vacuum, gradually and continuously depositing upon the surface thereof to be coated a film of metallic coating material while simultaneously unidirectionally transmitting a concentrated beam of light from one side of the article through the coating being deposited thereon and through the article and substantially perpendicularly thereto while the article is in the same vacuum and upon a light measuring device located on the opposite side of the article to determine the degree of transparency of the coating as it is deposited on the article, and then while the article is still in the same vacuum terminating the deposition of the film of metallic coating material on the article when the predetermined degree of transparency is indicated on said device.

4. A method of producing upon a surface of a transparent article a coating having a predetermined degree of transparency which comprises gradually and continuously depositing upon said surface a film of metallic coating material while simultaneously determining as the deposition of coating material takes place the degree of transparency of the coating by unidirectionally transmitting through the coating and article substantially perpendicularly to the surface of the article a concentrated beam of light passing from one side of the article through the same and registering upon a light measuring device located on the opposite side of the article, and then when said device indicates that said coating has reached the predetermined degree of transparency terminating the deposition of the coating material on the surface of the article.

5. A method of producing upon a surface of a transparent article a semi-transparent coating of predetermined transparency, which comprises positioning the article in a vacuum chamber, evacuating said chamber, unidirectionally transmitting a concentrated beam of light from exteriorly of one side of the chamber through the same and through said article substantially perpendicularly to the walls of the chamber and to said surface of the article and upon a light measuring device arranged exteriorly of the opposite side of the chamber, then continuously depositing upon the surface of the article while in the same vacuum a film of metallic coating material while simultaneously with the deposition of the material on the surface of the article observing said device to determine when the coating has obtained to the desired degree of transparency, and then forthwith terminating the further deposition of the coating material upon the surface of the article.

6. A method of producing upon a surface of a transparent article a coating having a predetermined degree of transparency and also particular characteristics with respect to the transmission and reflection of different colors, which comprises positioning the article in a vacuum and while therein depositing upon the surface of the article successive films of different metallic materials of known color and light transmission and reflection characteristics and in such order and amounts of deposition that the final coating will have the desired transmission and reflection characteristics, and simultaneously with the depositions of the films and while the article is in the same vacuum unidirectionally transmitting a concentrated beam of light through the coating and the article and substantially perpendicularly thereto from one side of the article to the opposite side thereof and upon a light measuring device located on said opposite side of the article, determining by observing said device the changes occurring in the transparency of the article as each film is deposited thereon, and when the deposition of each film has reached the predetermined amount as indicated by said device, then changing from the further deposition of said film to the deposition of the next succeeding film to be deposited upon the article until all of the predetermined successive films have been deposited upon the article.

7. A method of producing upon a surface of a transparent article a coating having a predetermined degree of transparency, and which comprises arranging a plurality of transparent articles in a predetermined position such that corresponding surfaces of the article will receive simultaneously a deposition of metallic coating material from a common source, simultaneously depositing upon said surfaces from said common source equal depositions of the coating material and simultaneously with the deposition of said material upon the articles determining the changes in the degree of transparency occurring in all of the articles by unidirectionally transmitting a concentrated beam of light substantially perpendicularly through one of the articles and the coating thereon and upon a light measuring device.

8. An apparatus for producing upon a surface of a transparent article a coating having a predetermined degree of transparency, comprising means for producing the deposition of coating material upon the surface of the article, means for measuring the degree of transparency of the article progressively and simultaneously with the deposition of the coating material thereon and including a light producing element located and constructed so as to unidirectionally transmit a concentrated beam of light substantially perpendicularly through the coating and article from one side to the opposite side of the article and a light measuring device located behind the article in position so that said beam of light will register thereon after it has been unidirectionally transmitted through the article.

9. An apparatus for producing on a surface of a transparent article a coating having a predetermined degree of transparency comprising a chamber having aligned transparent wall portions, means for producing a deposit of coating material upon the surface of the article, and means for determining the degree of transparency of the coating and article and including an element arranged exteriorly of the chamber on one side thereof for producing a concentrated beam of light unidirectionally passing substantially perpendicularly through said transparent wall portions of said chamber and through the article, and a light measuring device located exteriorly of said chamber on the opposite side thereof from said element and upon which said beam of light registers.

10. An apparatus for producing upon a surface of a transparent article a coating having a predetermined degree of transparency comprising a chamber having aligned transparent wall portions, a support for said article, means for producing a deposit of coating material upon the surface of the article, a shield protecting one of said transparent wall portions of the chamber from receiving a deposit of the coating material, said support and the article protecting another of the transparent wall portions from receiving a deposit of the coating material, and means for determining the degree of transparency of the article and the coating and including an element located exteriorly of the chamber for producing a concentrated beam of light unidirectionally passing through said aligned wall portions of the chamber and said article, and a light measuring device located exteriorly of the chamber on the opposite side thereof from said element and upon which said beam of light registers.

11. An apparatus for producing upon a surface of a transparent article a coating having a predetermined degree of transparency comprising means for supporting a plurality of transparent articles in predetermined position, means for producing simultaneously an equal deposition of coating material upon a surface of said articles, and means for determining simultaneously the degree of transparency of the coatings on said articles and including an element for producing a concentrated beam of light passing unidirectionally and substantially perpendicularly through one of said articles, and a light measuring device upon which said beam of light registers.

12. An apparatus for producing upon a surface of a transparent article a coating having a predetermined degree of transparency comprising a non-transparent chamber adapted to be evacuated and to receive the article and provided in its opposite walls with aligned openings, transparent means closing said openings, means for evacuating said chamber, means in said chamber for producing a deposition of coating material upon the surface of the article, and means for determining the degree of transparency of the article while it is being coated and including an element arranged to unidirectionally pass a concentrated beam of light from the exterior of said chamber substantially perpendicularly through said openings and the transparent closure means therefor and the article, and a light measuring device located exteriorly of the chamber upon which said beam of light registers.

ROBLEY C. WILLIAMS.
JOHN E. RUEDY.